(12) United States Patent
Naito et al.

(10) Patent No.: US 12,434,574 B2
(45) Date of Patent: Oct. 7, 2025

(54) MOUNTING STRUCTURE FOR FUEL CELL SYSTEM

(71) Applicant: HONDA MOTOR CO., LTD., Tokyo (JP)

(72) Inventors: Hideharu Naito, Wako (JP); Hideki Ichinose, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 900 days.

(21) Appl. No.: 17/677,353

(22) Filed: Feb. 22, 2022

(65) Prior Publication Data

US 2022/0274492 A1 Sep. 1, 2022

(30) Foreign Application Priority Data

Mar. 1, 2021 (JP) ................. 2021-031885

(51) Int. Cl.
| | |
|---|---|
| *B60L 50/00* | (2019.01) |
| *B60K 1/04* | (2019.01) |
| *B60L 50/71* | (2019.01) |
| *B60L 50/72* | (2019.01) |
| *H01M 8/2475* | (2016.01) |
| *B60L 58/33* | (2019.01) |

(52) U.S. Cl.
CPC ............. *B60L 50/72* (2019.02); *B60K 1/04* (2013.01); *B60L 50/71* (2019.02); *H01M 8/2475* (2013.01); *B60L 58/33* (2019.02); *H01M 2250/20* (2013.01)

(58) Field of Classification Search
CPC .......... B60L 50/72; B60L 50/71; B60L 58/33; B60K 1/04; B60K 2001/0411; H01M 8/2475; H01M 2250/20
See application file for complete search history.

(56) References Cited

U.S. PATENT DOCUMENTS

| | | | |
|---|---|---|---|
| 9,711,819 B2 * | 7/2017 | Ishikawa | B60L 50/71 |
| 2014/0367182 A1 * | 12/2014 | Yoshinaga | H01M 8/2475 |
| | | | 180/68.4 |
| 2015/0251560 A1 * | 9/2015 | Ishikawa | B62D 21/15 |
| | | | 429/469 |
| 2016/0207387 A1 * | 7/2016 | Itoga | H01M 8/2475 |
| 2017/0117570 A1 | 4/2017 | Ishikawa et al. | |
| 2020/0235411 A1 * | 7/2020 | Naito | H01M 8/2475 |
| 2020/0235418 A1 * | 7/2020 | Naito | H01M 8/2457 |

FOREIGN PATENT DOCUMENTS

JP 2017-081209 A 5/2017

* cited by examiner

*Primary Examiner* — Steven O Douglas
(74) *Attorney, Agent, or Firm* — Carrier, Shende & Associates P.C.; Fulchand P. Shende; Joseph P. Carrier (57) ABSTRACT

A mounting structure for a fuel cell system includes a drive unit and a connecting structure. The connecting structure includes a first mount, a second mount, and a third mount. The first mount connects one end of the case unit in the stacking direction to the drive unit. The second mount connects the other end of the case unit in the stacking direction to the drive unit. The third mount connects the electrical unit to the drive unit.

8 Claims, 5 Drawing Sheets

MOUNTING STRUCTURE FOR FUEL CELL SYSTEM

CROSS-REFERENCE TO RELATED APPLICATIONS

This application is based upon and claims the benefit of priority from Japanese Patent Application No. 2021-031885 filed on Mar. 1, 2021, the contents of which are incorporated herein by reference.

BACKGROUND OF THE INVENTION

Field of the Invention

The present invention relates to a mounting structure for a fuel cell system.

Description of the Related Art

A fuel cell system mounted on a vehicle needs to be reliably fixed to a vehicle body in order to satisfactorily protect the fuel cell system from an external load such as vibrations or collision during traveling of the vehicle. A mounting structure of this type of fuel cell system (fuel cell stack) is disclosed in, for example, JP 2017-081209 A.

In the mount structure disclosed in JP 2017-081209 A, a travel motor is disposed under the fuel cell stack, and a mount member is disposed rearward of the traveling motor in the vehicle. The mount member is fixed to a vehicle body. The mount member is connected to a bracket member and to the travel motor. The bracket member is fixed to the fuel cell stack.

SUMMARY OF THE INVENTION

In the above-described mounting structure, since the mount member is disposed rearward of the travel motor in the vehicle, the mounting structure tends to be large.

An object of the present invention is to solve the above-described problems.

In an aspect of the present invention, a mounting structure for a fuel cell system to be mounted on a vehicle includes: the fuel cell system; a drive unit arranged at a position lower than the fuel cell system and configured to drive the vehicle; and a connecting structure configured to connect the fuel cell system to the drive unit, wherein the fuel cell system includes a fuel cell stack having a cell stack body formed of a plurality of power generation cells stacked one another, and a case unit covering the cell stack body, and an electrical unit configured to control the fuel cell stack, the electrical unit is fixed to an outer surface of the case unit, the outer surface facing a direction perpendicular to a stacking direction of the plurality of power generation cells, the drive unit includes a fixing portion configured to fix the drive unit to a vehicle body, the connecting structure includes: a first mount connecting one end of the case unit in the stacking direction to the drive unit; a second mount connecting another end of the case unit in the stacking direction to the drive unit; and a third mount connecting the electrical unit to the drive unit.

According to the present invention, both end portions of the case unit are connected to the drive unit through the first mount and the second mount. Further, the electrical unit fixed to the outer surface of the case unit is connected to the drive unit through the third mount. Further, the drive unit is fixed to the vehicle body by the fixing portion. Therefore, the fuel cell system can be favorably protected from an external load. Further, since it is not necessary to provide a member for fixing the fuel cell system separately outside the drive unit, the mounting structure for the fuel cell system can be made simple and compact.

The above and other objects, features and advantages of the present invention will become more apparent from the following description when taken in conjunction with the accompanying drawings in which a preferred embodiment of the present invention is shown by way of illustrative example.

DESCRIPTION OF THE INVENTION

Figure 1:
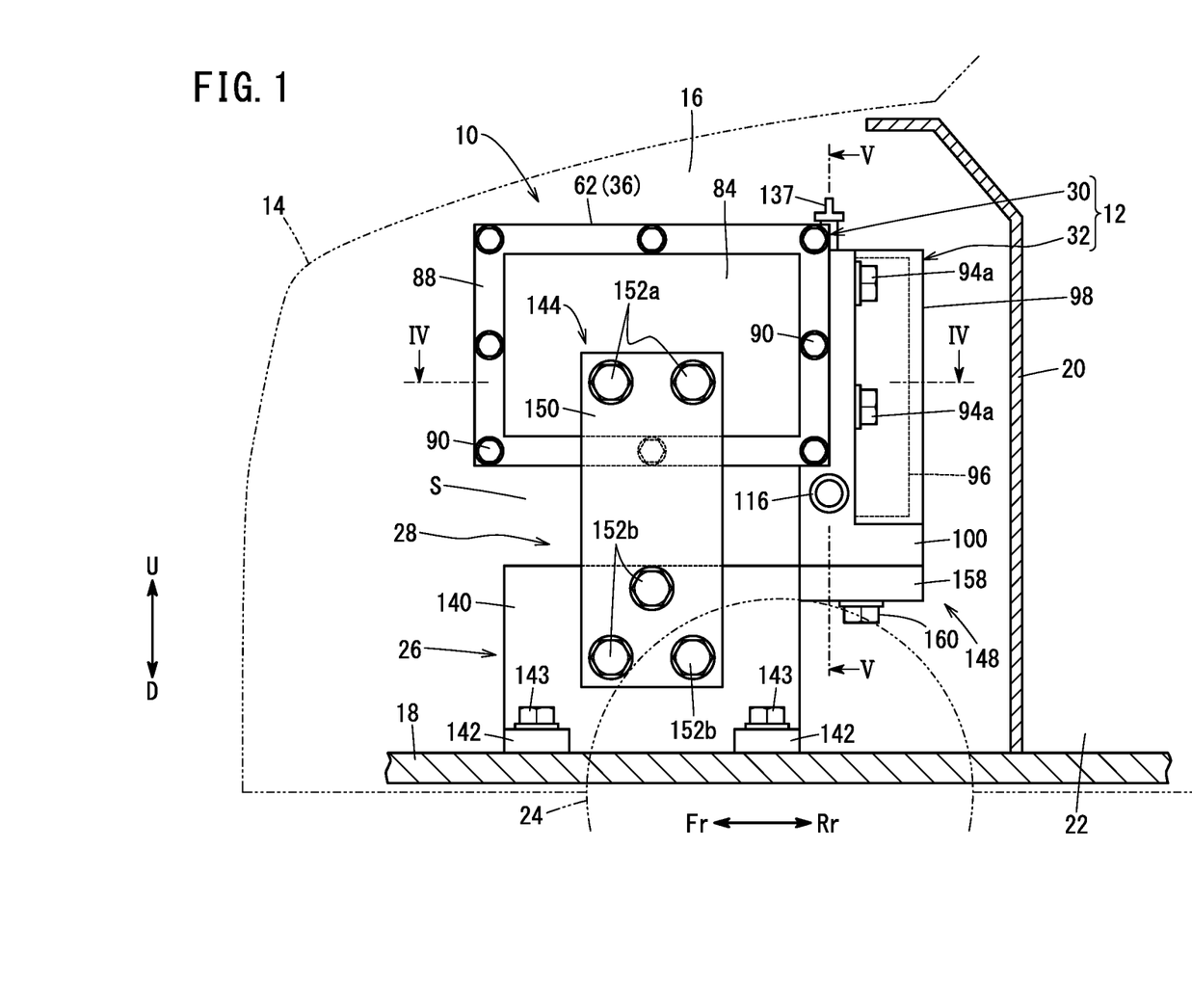
FIG. 1 is a schematic side explanatory view of the front part of a vehicle provided with a mounting structure for a fuel cell system according to an embodiment of the present invention.
Figure 2:
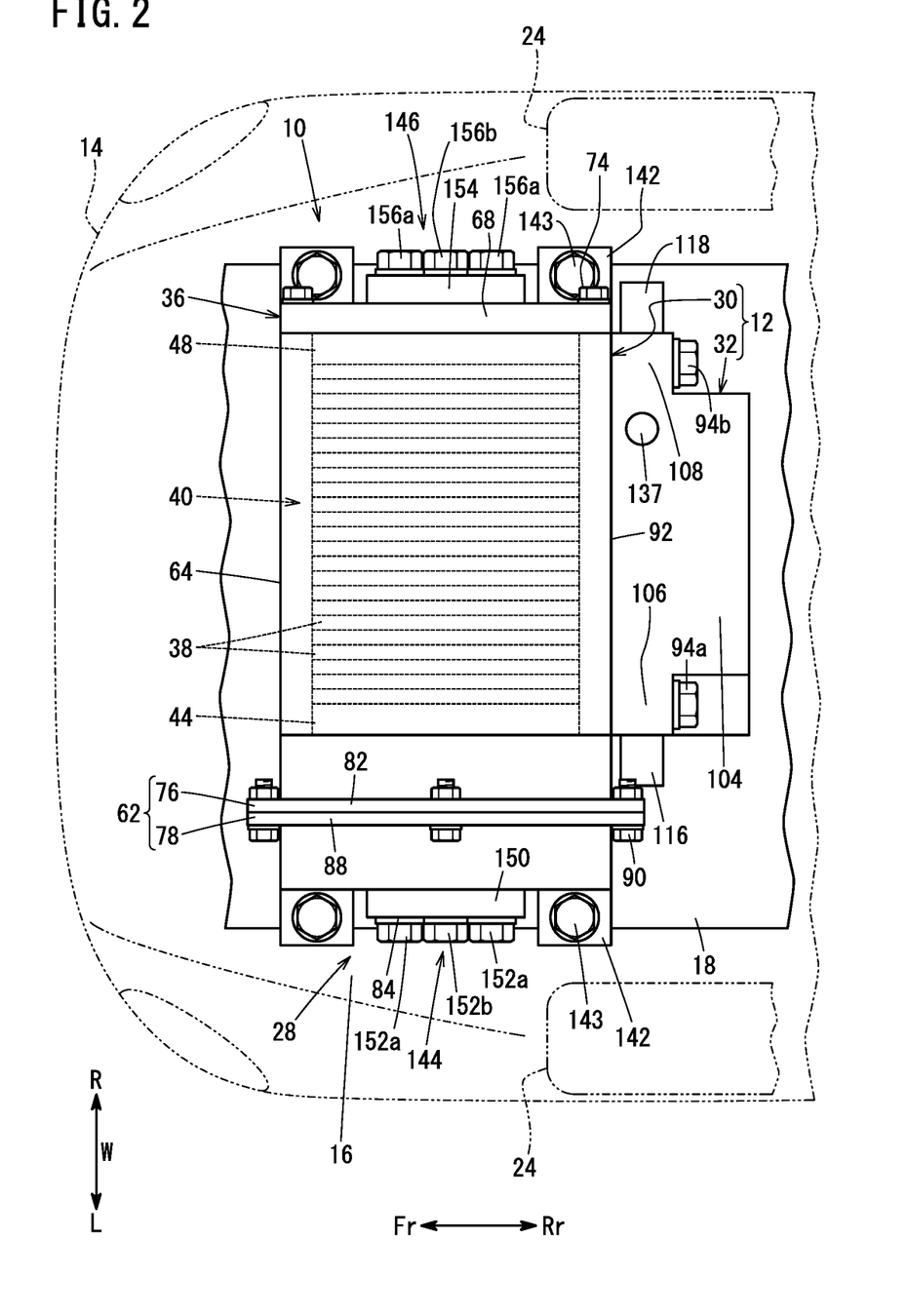
FIG. 2 is a schematic plan explanatory view of the vehicle.
Figure 3:
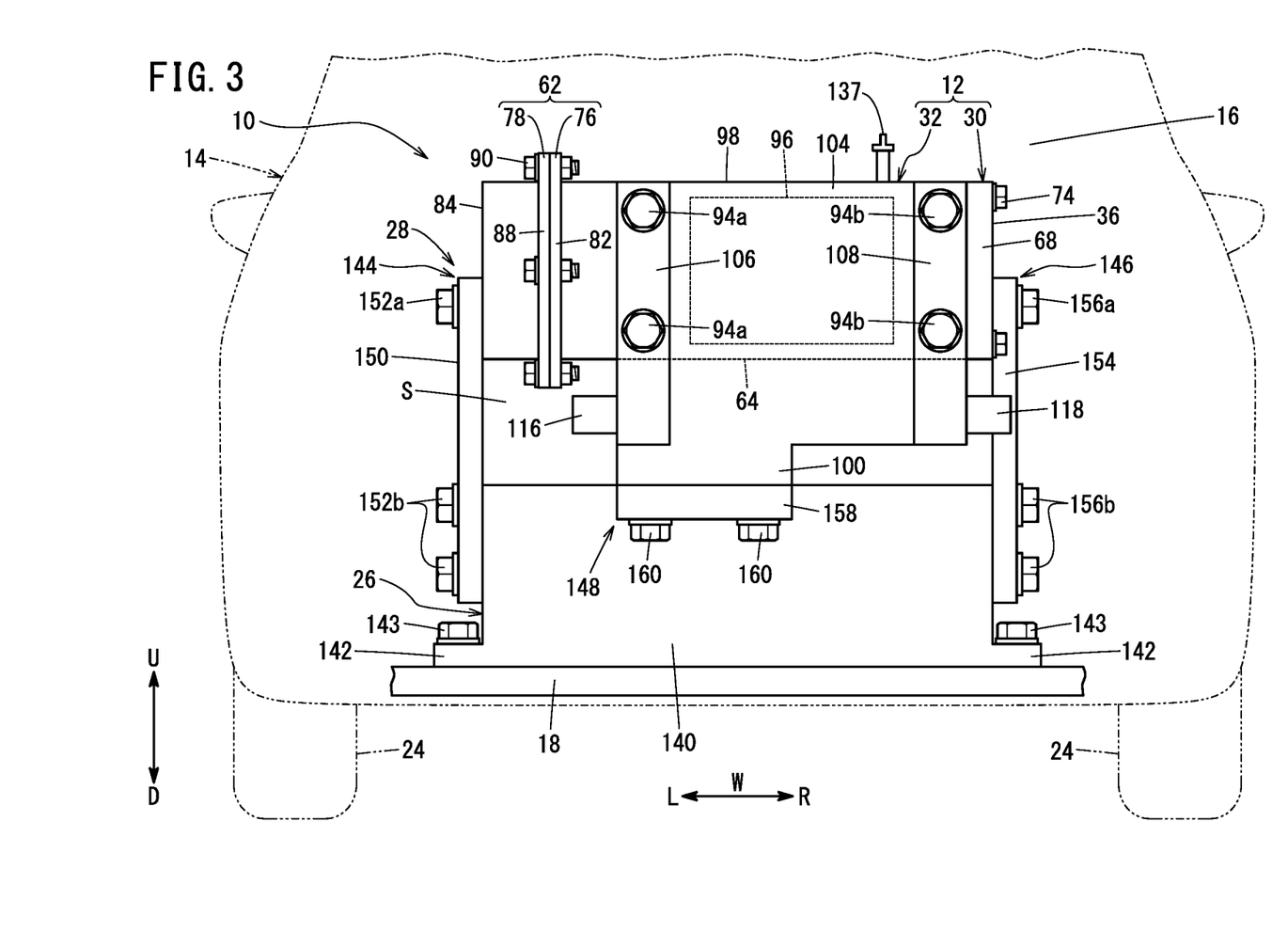
FIG. 3 is an explanatory view of the mounting structure for the fuel cell system of FIG. 1 as seen from the rear side of the vehicle.

As shown in FIGS. 1 to 3, a mounting structure 10 for a fuel cell system 12 according to an embodiment of the present invention (hereinafter simply referred to as "mounting structure 10") is attached to a motor room 16 (front box) of a vehicle 14 (fuel cell vehicle). In other words, the fuel cell system 12 is fixed to a vehicle body 18 (vehicle body frame) arranged in the motor room 16. The motor room 16 is separated from a vehicle cabin 22 by a dashboard 20 (see FIG. 1). The motor room 16 is located between the left and right front wheels 24.

In each drawing, with reference to the vehicle 14, the left side of the vehicle 14 as viewed from a driver's seat is indicated by an arrow "L", the right side of the vehicle 14 is indicated by an arrow "R", the front side of the vehicle 14 is indicated by an arrow "Fr", the rear side of the vehicle 14 is indicated by an arrow "Rr", the upper side of the vehicle 14 is indicated by an arrow "U", and the lower side of the vehicle 14 is indicated by an arrow "D".

In FIGS. 1 to 3, the mounting structure 10 includes the fuel cell system 12, a drive unit 26, and a connecting structure 28. The drive unit 26 is disposed under the fuel cell system 12. The connecting structure 28 connects the fuel cell system 12 to the drive unit 26.

Figure 4:
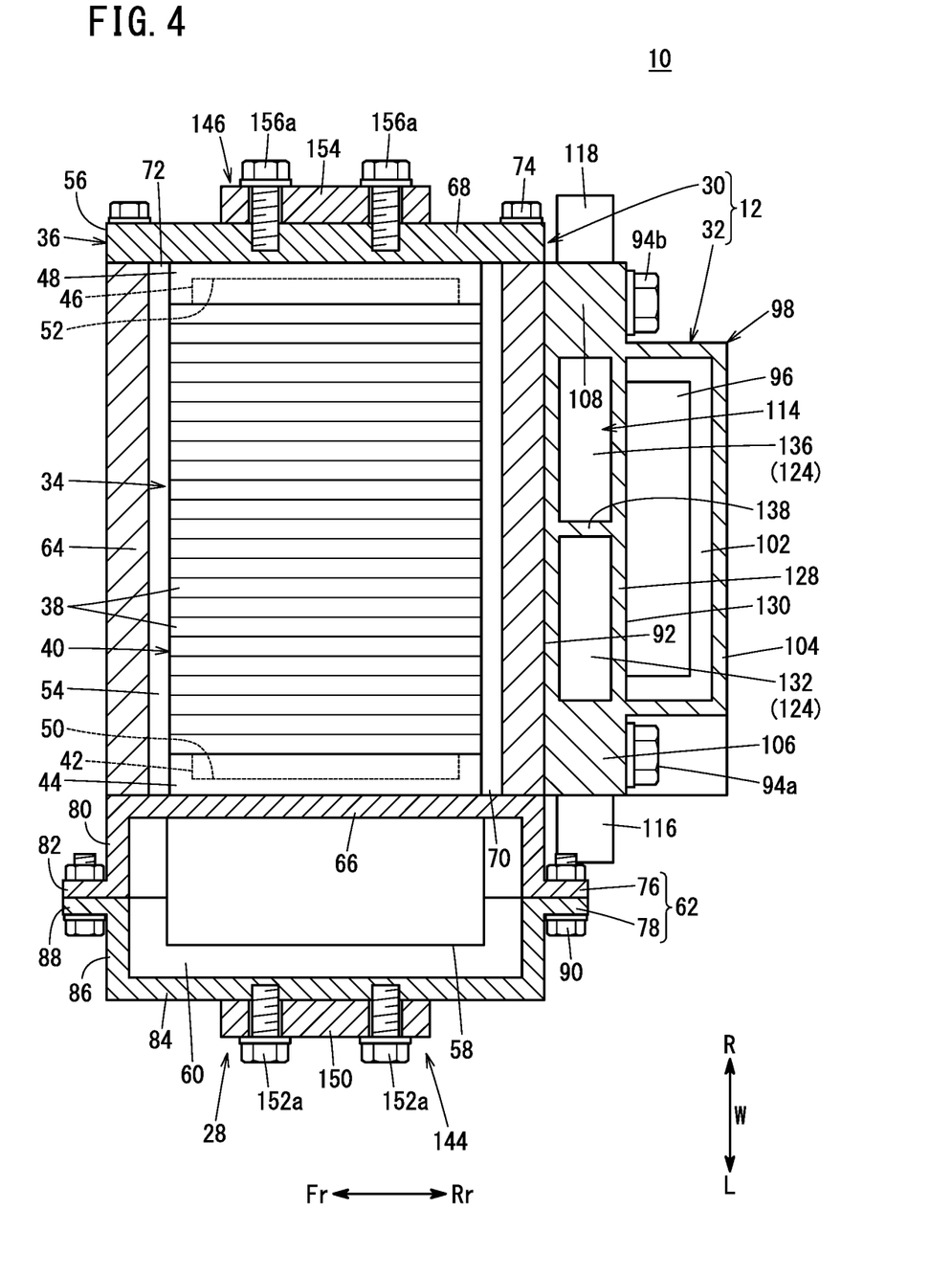
FIG. 4 is an explanatory cross-sectional view taken along line IV-IV of FIG. 1.

As shown in FIG. 4, the fuel cell system 12 includes a fuel cell stack 30 and an electrical unit 32 that controls the fuel cell stack 30. The fuel cell stack 30 includes a stack body 34 and a case unit 36. The stack body 34 includes a cell stack body 40. The cell stack body 40 includes a plurality of power generation cells 38 stacked one another. As shown in FIG. 2, the fuel cell system 12 is mounted in the motor room 16 of the vehicle 14 such that the stacking direction of the plurality of power generation cells 38 extends in the vehicle width direction (the arrow W direction).

In FIG. 4, a first terminal plate 42 and a first insulating plate 44 are disposed outward in this order (the direction of the arrow L) at one end (end on the arrow L side) in the stacking direction of the cell stack body 40. A second terminal plate 46 and a second insulating plate 48 are disposed outward in this order (the direction of the arrow R) at the other end (end on the arrow R side) of the cell stack body 40 in the stacking direction. The stack body 34 includes the cell stack body 40, the first terminal plate 42, the first insulating plate 44, the second terminal plate 46, and the second insulating plate 48.

Each of the first terminal plate 42 and the second terminal plate 46 is made of a conductive material (for example, a metal material such as copper or aluminum). Each of the first insulating plate 44 and the second insulating plate 48 is made of, for example, a resin material having electrical insulating properties.

An inner surface (surface on the arrow R side) of the first insulating plate 44 facing the cell stack body 40 has a first recess 50 in which the first terminal plate 42 is disposed. An inner surface (surface on the arrow L side) of the second insulating plate 48 facing the cell stack body 40 has a second recess 52 in which the second terminal plate 46 is disposed.

The power generation cell 38 generates power by electrochemical reactions between a fuel gas (for example, a hydrogen-containing gas) and an oxygen-containing gas. Although detailed illustration is omitted, the power generation cell 38 includes a membrane electrode assembly (MEA), and an anode separator and a cathode separator sandwiching the MEA. The MEA includes an electrolyte membrane, an anode disposed on one surface of the electrolyte membrane, and a cathode disposed on the other surface of the electrolyte membrane. The anode separator has a fuel gas flow filed for supplying fuel gas to the anode. The cathode separator has an oxygen-containing gas flow filed for supplying the oxygen-containing gas to the cathode.

In FIG. 4, the case unit 36 includes a stack case 56 and an auxiliary device case 62. The stack case 56 has a stack housing space 54 for housing the stack body 34. The auxiliary device case 62 has an auxiliary device housing space 60 for housing a fuel cell auxiliary device 58. The case unit 36 has a rectangular shape when viewed from the up-down direction (the arrow U direction and the arrow D direction) and the vehicle front-rear direction (the arrow Fr direction and the arrow Rr direction). A long side of the case unit 36 extends along the vehicle width direction (the arrow W direction) (see FIGS. 2 and 3).

The stack case 56 includes a peripheral wall case 64 having a quadrangularly tubular shape, a first end plate 66, and a second end plate 68. The peripheral wall case 64 covers the outer peripheral surface of the stack body 34. The first end plate 66 is disposed at one end (end on the arrow L side) of the peripheral wall case 64. The second end plate 68 is disposed at the other end (end on the arrow R side) of the peripheral wall case 64. That is, the stack housing space 54 is a space covered by the peripheral wall case 64, the first end plate 66, and the second end plate 68.

A first opening 70 is opened at the one end of the peripheral wall case 64. A second opening 72 is opened at the other end of the peripheral wall case 64. The first end plate 66 is joined to the peripheral wall case 64 by bolts (not shown) so as to close the first opening 70. The second end plate 68 is joined to the peripheral wall case 64 by bolts 74 so as to close the second opening 72.

The auxiliary device case 62 is a protective case for protecting the fuel cell auxiliary device 58 housed in the auxiliary device housing space 60. Examples of the fuel cell auxiliary device 58 housed in the auxiliary device housing space 60 include a gas-liquid separator, an injector, an ejector, a fuel gas pump, and valves, which are not illustrated.

The auxiliary device case 62 includes a box-shaped first case member 76 and a box-shaped second case member 78. The first case member 76 is open toward the arrow L direction. The second case member 78 is open toward the arrow R direction. The first case member 76 and the second case member 78 are joined to each other. The first case member 76 includes the above-described first end plate 66, a first peripheral wall portion 80, and an annular first flange 82. The first peripheral wall portion 80 protrudes in the arrow L direction from an outer peripheral edge portion of the first end plate 66. The first flange 82 is provided at a protruding end of the first peripheral wall portion 80. The first end plate 66 serves as both a wall portion of the stack case 56 and a wall portion of the auxiliary device case 62. In other words, the first end plate 66 is a partition wall between the stack housing space 54 and the auxiliary device housing space 60.

The second case member 78 includes an outer plate 84, a second peripheral wall portion 86, and an annular second flange 88. The outer plate 84 is positioned at an end of the case unit 36 on the arrow L side. The second peripheral wall portion 86 protrudes in the arrow R direction from the outer peripheral edge portion of the outer plate 84. The second flange 88 is provided at a protruding end of the second peripheral wall portion 86. The first case member 76 and the second case member 78 are fastened to each other by bolts 90 in a state in which the first flange portion 82 and the second flange portion 88 are in contact with each other.

The electrical unit 32 is fixed to an outer surface 92 of the case unit 36 that faces a direction perpendicular to the stacking direction of the plurality of power generation cells 38. To be specific, the electrical unit 32 is joined to the outer surface 92 of the peripheral wall case 64 facing the vehicular rear side (the arrow Rr side) by a plurality of bolts 94*a* and 94*b*. As shown in FIG. 3, the electrical unit 32 has a substantially quadrangular shape when viewed from the direction of the arrow Rr. The electrical unit 32 extends lower than the peripheral wall case 64 (case unit 36).

In FIGS. 3 and 4, the electrical unit 32 includes an electrical unit main body 96 and an electrical unit case 98 that houses the electrical unit main body 96. The electrical unit main body 96 includes a voltage control unit (VCU: Voltage Control Unit) that controls the voltage of the fuel cell stack 30. The electrical unit case 98 extends lower than the lower end of the case unit 36 (peripheral wall case 64). A protruding portion 100 that protrudes downward is formed integrally with the electrical unit case 98 at the lower portion of the electrical unit case 98 (see FIGS. 3 and 5). The protruding portion 100 is shifted in the arrow L direction from the center of the electrical unit 32 in the arrow W direction. Thus, the protruding portion 100 can suitably receive the weight of the auxiliary device case 62.

The electrical unit case 98 includes a case main body portion 104, a first attachment portion 106, and a second attachment portion 108. The case main body portion 104 has a housing space 102 (see FIG. 4) for housing the electrical unit main body 96. The first attachment portion 106 extends in the arrow L direction from an end of the case main body portion 104 on the arrow L side. The second attachment portion 108 extends in the arrow R direction from another end of the case main body portion 104 on the arrow R side. In FIG. 4, the thickness of each of the first attachment portion 106 and the second attachment portion 108 is smaller than the thickness of the case main body portion 104 (the size in the vehicle front-rear direction is small). In FIG. 3, the first attachment portion 106 and the second attachment portion 108 extend over the entire length of the case main body portion 104 in the up-down direction. The protruding portion 100 extends across the first attachment portion 106 and the case main body portion 104.

Figure 5:
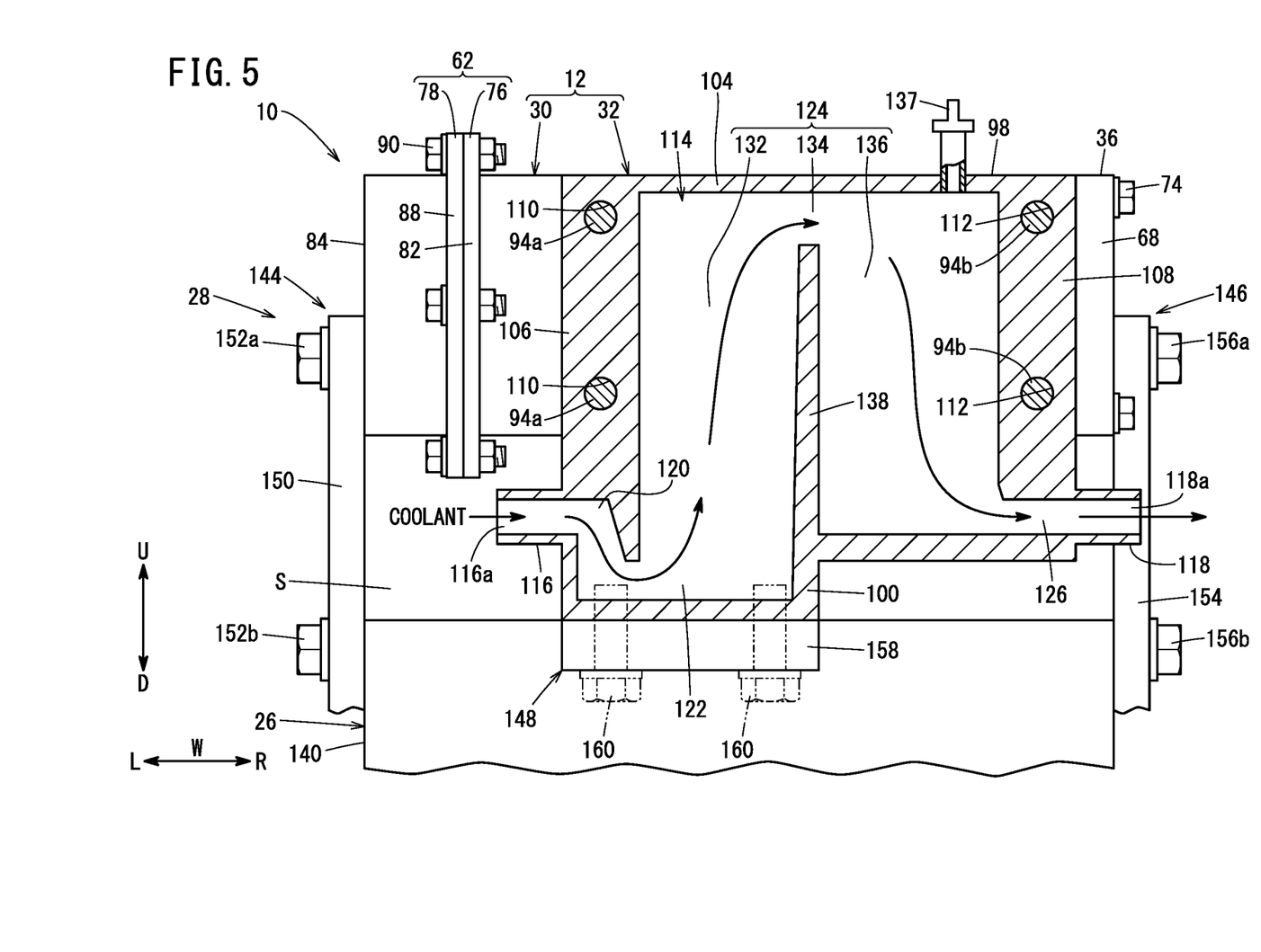
FIG. 5 is an explanatory cross-sectional view taken along line V-V of FIG. 1.

As shown in FIG. 5, for example, two insertion holes 110 through which two bolts 94a are inserted are formed in the first attachment portion 106. For example, two insertion holes 112 through which two bolts 94b are inserted are formed in the second attachment portion 108. The number and positions of the bolts 94a and 94b and the insertion holes 110 and 112 can be set as appropriate as long as the electrical unit case 98 is reliably fixed to the peripheral wall case 64.

A coolant flow path 114 for allowing a coolant to flow therethrough for cooling the electrical unit 32 is formed in a wall portion of the electrical unit case 98. The coolant is introduced into the coolant flow path 114 from an introduction port 116. The introduction port 116 is provided at a lower portion of the first attachment portion 106. The coolant flowing through the coolant flow path 114 is led out from a lead-out port 118 provided in a lower portion of the second attachment portion 108. The introduction port 116 protrudes outward (in the direction of arrow L) from a side surface (outer surface on the arrow L side) of the first attachment portion 106. The lead-out port 118 protrudes outward (in the direction of arrow R) from a side surface (outer surface on the arrow R side) of the second attachment portion 108. Examples of the coolant flowing through the coolant flow path 114 include, but are not limited to, water and ethylene glycol.

The coolant flow path 114 includes a coolant introduction path 120, a first cooling flow path 122, a second cooling flow path 124, and a coolant lead-out path 126. The coolant introduction path 120 is located in the wall portion of the first attachment portion 106 so as to communicate with the inner hole 116a of the introduction port 116. The first cooling flow path 122 is positioned inside the wall portion of the protruding portion 100 so as to extend in the vehicle width direction (the arrow W direction, the stacking direction of the power generation cells 38). One end (end on the arrow L side) of the first cooling flow path 122 communicates with the coolant introduction path 120.

The second cooling flow path 124 is located in a wall portion of the case main body portion 104. In FIG. 4, the second cooling flow path 124 is located between the housing space 102 and the peripheral wall case 64. In other words, the second cooling flow path 124 and the housing space 102 are partitioned by a partition wall 128. The partition wall 128 forms a wall surface 130 on the vehicle front side of the housing space 102. The electrical unit main body 96 is attached to the wall surface 130 of the partition wall 128.

As shown in FIG. 5, the second cooling flow path 124 includes a first vertically extending flow path portion 132, a folded flow path portion 134, and a second vertically extending flow path portion 136. The first vertically extending flow path portion 132 and the second vertically extending flow path portion 136 extend linearly along the up-down direction. However, the first vertically extending flow path portion 132 and the second vertically extending flow path portion 136 may extend while being curved (for example, in a wave shape) along the up-down direction. The first vertically extending flow path portion 132 and the second vertically extending flow path portion 136 are arranged side-by-side in the vehicle width direction and are partitioned by a wall portion 138. One end (lower end) of the first vertically extending flow path portion 132 communicates with the other end (end on the arrow R side) of the first cooling flow path 122.

The folded flow path portion 134 allows the other end (upper end) of the first vertically extending flow path portion 132 and one end (upper end) of the second vertically extending flow path portion 136 to communicate with each other. The folded flow path portion 134 extends in the vehicle width direction. However, the folded flow path portion 134 may have an arc-like shape that is convex upward. The coolant lead-out path 126 is located in the wall portion of the second attachment portion 108 so as to communicate the other end (lower end) of the second vertically extending flow path portion 136 and the inner hole 118a of the lead-out port 118 with each other. An air vent port 137 for releasing air in the coolant flow path 114 to the outside is provided in an upper wall portion of the case main body portion 104.

As shown in FIGS. 1 and 3, the drive unit 26 includes a drive unit main body 140 and a plurality of fixing portions 142. The drive unit main body 140 is disposed under the fuel cell system 12. The fixing portions 142 are provided to the drive unit main body 140. The plurality of fixing portions 142 are fixed to the vehicle body 18. The drive unit main body 140 drives the vehicle 14 with at least one of electric power generated by the fuel cell system 12 and electric power supplied from a battery or the like (not shown). Specifically, the drive unit main body 140 includes a travel motor, a speed reducer, and the like (not shown). That is, the drive unit main body 140 rotates the front wheels 24 of the vehicle 14. However, the drive unit main body 140 may rotate the rear wheels (not shown) of the vehicle 14.

A gap S is formed between the upper surface of the drive unit main body 140 and the lower surface of the case unit 36. The fixing portions 142 are joined to the vehicle body 18 by bolts 143. In the present embodiment, the number of fixing portions 142 is four. The number, position, size, shape, and the like of the plurality of fixing portions 142 can be set as appropriate.

As shown in FIGS. 1 to 5, the connecting structure 28 includes a first mount 144, a second mount 146, and a third mount 148. The first mount 144 connects one end portion of the case unit 36 (the end portion on the arrow L side) to the drive unit main body 140. The first mount 144 includes a plate-shaped first connecting member 150 and a plurality of bolts 152a and 152b. The first connecting member 150 extends in the up-down direction. The plurality of bolts 152a and 152b are fastening members for fixing the first connecting member 150. An upper end portion of the first connecting member 150 is joined to the one end portion (an end surface on the arrow L side of the outer plate 84) of the case unit 36 by a plurality of bolts 152a. A lower end portion of the first connecting member 150 is joined to the drive unit main body 140 by a plurality of bolts 152b (see FIGS. 1 and 3).

In FIGS. 2 to 4, the second mount 146 connects the other end portion of the case unit 36 (the end portion on the arrow R side) to the drive unit main body 140. The second mount 146 includes a plate-shaped second connecting member 154 and a plurality of bolts 156a and 156b. The second connecting member 154 extends in the up-down direction. The plurality of bolts 156a and 156b are fastening members for fixing the second connecting member 154. An upper end portion of the second connecting member 154 is joined to the other end portion (an end surface on the arrow R side of the second end plate 68) of the case unit 36 by a plurality of bolts 156a. A lower end portion of the second connecting member 154 is fixed to the drive unit main body 140 by a plurality of bolts 156b (see FIG. 3).

In FIGS. 1, 3, and 5, the third mount 148 connects the electrical unit 32 to the drive unit 26. The third mount 148 includes the protruding portion 100, a third connecting member 158, and a plurality of bolts 160. The protruding portion 100 is integrally formed with the electrical unit case 98. The third connecting member 158 is integrally formed with the drive unit main body 140. The plurality of bolts 160 are fastening members for fixing the third connecting member 158 to the protruding portion 100. The third connecting member 158 protrudes from the drive unit main body 140 toward the vehicle rear side (the arrow Rr direction) (see FIG. 1).

As shown in FIGS. 3 and 5, the plurality of bolts 160 are two bolts 160. The plurality of bolts 160 join the protruding portion 100 and the third connecting member 158 to each other in a state where the protruding end surface (lower surface) of the protruding portion 100 and the upper surface of the third connecting member 158 are in contact with each other. The two bolts 160 are arranged in the vehicle width direction. Each bolt 160 is located on the vehicle rear side of the coolant flow path 114. The number and arrangement of the plurality of bolts 160 can be set as appropriate.

The mounting structure 10 for the fuel cell system 12 according to the present embodiment has the following effects.

The connecting structure 28 includes the first mount 144, the second mount 146, and the third mount 148. The first mount 144 connects the one end portion of the case unit 36 in the stacking direction to the drive unit 26. The second mount 146 connects the other end portion of the case unit 36 in the stacking direction to the drive unit 26. The third mount 148 connects the electrical unit 32 to the drive unit 26.

According to such a configuration, both end portions of the case unit 36 are connected to the drive unit 26 through the first mount 144 and the second mount 146. Further, the electrical unit 32 fixed to the outer surface 92 of the case unit 36 is connected to the drive unit 26 through the third mount 148. Further, the drive unit 26 is fixed to the vehicle body 18 by the fixing portions 142. Therefore, the fuel cell system 12 can be suitably protected from an external load (an external load such as vibrations or collision during traveling of the vehicle). The first mount 144, the second mount 146 and the third mount 148 are all connected to the drive unit 26. As a result, since there is no need to provide a member for fixing the fuel cell system 12 to an outer member, the mounting structure 10 can be made simple and compact.

The fuel cell stack 30 is mounted on the vehicle 14 such that the stacking direction thereof is oriented in the vehicle width direction (the direction of arrow W). The electrical unit 32 is fixed to the case unit 36 on its outer surface 92 that faces the vehicle rear side.

According to such a configuration, it is possible to suppress an increase in the size of the mounting structure 10 for the fuel cell system 12 in the vehicle width direction.

The electrical unit 32 includes the electrical unit main body 96 and the electrical unit case 98 covering the electrical unit main body 96. The third mount 148 includes the protruding portion 100 formed integrally with the electrical unit case 98 so as to protrude downward from the lower portion of the electrical unit case 98.

According to such a configuration, it is possible to suppress the third mount 148 from protruding further toward the vehicle rear side than the electrical unit main body 96.

The electrical unit case 98 has the coolant flow path 114 for cooling the electrical unit main body 96.

According to such a configuration, the electrical unit main body 96 can be efficiently cooled by the coolant flowing through the coolant flow path 114.

The coolant flow path 114 extends inside the protruding portion 100.

According to such a configuration, the protruding portion 100 can be cooled by the coolant flowing through the coolant flow path 114. Thus, the drive unit 26 can be cooled by the cooled protruding portion 100. Therefore, both the electrical unit main body 96 and the drive unit 26 can be cooled at the same time by the coolant flowing through the coolant flow path 114.

The coolant flow path 114 includes a folded flow path portion 134.

According to such a configuration, the cooling efficiency can be increased with a compact configuration.

Note that the present invention is not limited to the embodiments described above, and various configurations can be adopted without departing from the gist of the present invention. The first mount 144 and the second mount 146 may be joined to the lower surface of the case unit 36.

The above embodiments can be summarized as follows.

In an aspect of the present invention, the mounting structure (10) for the fuel cell system (12) to be mounted on the vehicle (14) includes: the fuel cell system; the drive unit (26) arranged at a position lower than the fuel cell system and configured to drive the vehicle; and the connecting structure (28) configured to connect the fuel cell system to the drive unit, wherein the fuel cell system includes the fuel cell stack (30) having the cell stack body (40) formed of the plurality of power generation cells (38) stacked one another, and a case unit (36) covering the cell stack body, and the electrical unit (32) configured to control the fuel cell stack, the electrical unit is fixed to the outer surface (92) of the case unit, the outer surface facing a direction perpendicular to the stacking direction of the plurality of power generation cells, the drive unit includes the fixing portion (142) configured to fix the drive unit to the vehicle body (18), the connecting structure includes: a first mount (144) connecting one end of the case unit in the stacking direction to the drive unit; a second mount (146) connecting another end of the case unit in the stacking direction to the drive unit; and a third mount (148) connecting the electrical unit to the drive unit.

In the above-described mounting structure for the fuel cell system, the fuel cell stack may be mounted on the vehicle such that the stacking direction extends along the vehicle width direction, and the outer surface of the case unit to which the electrical unit is fixed may face a rear side of the vehicle.

In the mounting structure for the fuel cell system, the electrical unit may include the electrical unit body (96) and the electrical unit case (98) covering the electrical unit body, and the third mount may include a protruding portion (100) integrally formed with the electrical unit case so as to protrude downward from the lower portion of the electrical unit case.

In the mounting structure for the fuel cell system described above, the electrical unit case may have the coolant flow path (114) for cooling the electrical unit main body.

In the mounting structure for the fuel cell system described above, the coolant flow path may extend inside the protruding portion.

In the mounting structure for the fuel cell system described above, the coolant flow path may include the folded flow path portion (134).

What is claimed is:

1. A mounting structure for a fuel cell system to be mounted on a vehicle, comprising the fuel cell system;
   a drive unit arranged at a position lower than the fuel cell system and configured to drive the vehicle; and
   a connecting structure configured to connect the fuel cell system to the drive unit, wherein
   the fuel cell system comprises:
   a fuel cell stack including a cell stack body having a plurality of power generation cells stacked one another and a case unit covering the cell stack body; and
   an electrical unit configured to control the fuel cell stack,
   the electrical unit is fixed to an outer surface of the case unit, the outer surface facing a direction perpendicular to a stacking direction of the plurality of power generation cells,
   the drive unit includes a fixing portion configured to fix the drive unit to a vehicle body, and
   the connecting structure comprises:
   a first mount connecting one end portion of the case unit in the stacking direction to the drive unit;
   a second mount connecting another end portion of the case unit in the stacking direction to the drive unit; and
   a third mount connecting the electrical unit to the drive unit.

2. The mounting structure for a fuel cell system according to claim 1, wherein
   the fuel cell stack is mounted on the vehicle such that the stacking direction extends along a vehicle width direction, and
   the outer surface of the case unit to which the electrical unit is fixed faces a rear side of the vehicle.

3. The mounting structure for the fuel cell system according to claim 1, wherein
   the electrical unit comprises:
   an electrical unit main body;
   an electrical unit case that covers the electrical unit main body,
   wherein the third mount includes a protruding portion integrally formed with the electrical unit case so as to protrude downward from a lower portion of the electrical unit case.

4. The mounting structure for the fuel cell system according to claim 3, wherein the electrical unit case has a coolant flow path for cooling the electrical unit main body.

5. The mounting structure for the fuel cell system according to claim 4, wherein the coolant flow path extends inside the protruding portion.

6. The mounting structure for the fuel cell system according to claim 4, wherein the coolant flow path includes a folded flow path portion.

7. The mounting structure for the fuel cell system according to claim 4, wherein the coolant flow path is positioned between the electrical unit main body and the case unit.

8. The mounting structure for the fuel cell system according to claim 3, wherein a lower end of the electrical unit case protrudes more downward than a lower end of the case unit.

* * * * *